US005310136A

United States Patent [19]
Fowler et al.

[11] Patent Number: 5,310,136
[45] Date of Patent: May 10, 1994

[54] HELICOPTER INTEGRATED FIRE AND FLIGHT CONTROL HAVING CONSTRAINT LIMITING CONTROL

[75] Inventors: Donald W. Fowler, Oxford; Nicholas D. Lappos, Milford, both of Conn.

[73] Assignee: United Technologies Corporation, Hartford, Conn.

[21] Appl. No.: 885,799

[22] Filed: May 19, 1992

[51] Int. Cl.$^5$ ............................................. B64C 11/34
[52] U.S. Cl. .............................. 244/17.13; 244/75 R; 89/41.21; 364/423
[58] Field of Search ................ 244/17.13, 75 R, 76 R, 244/221; 89/41.21; 364/423, 424.01, 434

[56] References Cited

U.S. PATENT DOCUMENTS

| | | | |
|---|---|---|---|
| 2,737,652 | 3/1956 | White et al. | 89/41.21 |
| 3,383,987 | 5/1968 | MacMillan | 89/41.21 |
| 4,382,283 | 5/1983 | Clelford et al. | 244/17.13 |
| 4,528,891 | 7/1985 | Branello et al. | 89/41.21 |

FOREIGN PATENT DOCUMENTS 2025007  1/1980  United Kingdom ............... 89/41.21

OTHER PUBLICATIONS

McDonnell Douglas Helicopter Company, Integrated Air-to-Air Weapon (INTAAW) Evaluation System Definition Report, Final Issue, Jan. 23, 1990, pp. 6-1 to 6-31.
"A Simulator Investigation of Parameters Affecting Helicopter Handling Qualities in Air Combat (HAC II)", pp. 1-18, by Michael S. Lewis and M. Hossein Mansur, Aerospace Engineers, Ames Research Center; and Robert T. M. Chen, NASA Ames Research Center.
IFEE AES Systems Magazine, Jan. 1992, "Integrated Flight/Fire Control for Attack Helicopters", pp. 17-23, by Stephen Osder of McDonnell Douglas Helicopter Company.
*Chief Engineer*, vol. 6, No. 4, Jul.-Aug. 1983, "Design and Analysis of a Digitally Controlled Integrated Flight/Fire Control System", pp. 251-257, by John H. Blakelock, Applications Research Corporation.

*Primary Examiner*—Joseph F. Peters, Jr.
*Assistant Examiner*—Christopher P. Ellis
*Attorney, Agent, or Firm*—Michael Grillo

[57] ABSTRACT

During operation of an integrated fire and flight control (IFFC) system in a coupled aiming mode, the occurrence of a weapon (172), weapon mount (145) or sensor (146) reaching a constraint limit (210) indices a fade-in of a constraint limiting axis command signal (140) for a respective attitude axis as the aircraft attitude reference, replacing the flight control system attitude feedback error signal (111) for the respective attitude axis. The constraint limiting axis command signals provide the aircraft attitude reference only while the pilot manually depresses and holds an enable switch (920). The pilot command stick input (90) remains the primary input to the IFFC system to thereby provide override capability for pilot command maneuvers.

15 Claims, 4 Drawing Sheets

HELICOPTER INTEGRATED FIRE AND FLIGHT CONTROL HAVING CONSTRAINT LIMITING CONTROL

TECHNICAL FIELD

The present invention relates to flight control systems for rotary wing aircraft and more particularly to an integrated fire and flight control system which provides aircraft azimuth and pitch control to prevent weapons or sensors from reaching constraint limits.

BACKGROUND OF THE INVENTION

The combat uses for helicopter aircraft have changed dramatically over the years to include contact with opposing forces, including reconnaissance and combat aircraft assistance of troops on the front line. This type of use subjects helicopters to numerous threats, and therefore new helicopter designs incorporate offensive weapons, such as Gatling guns and rocket launchers.

Initially, the primary control of helicopter weapons was accomplished by the pilot aiming the aircraft at the target prior to firing. Correction for misses was accomplished by the pilot adjusting the attitude of the aircraft prior to expending additional ordnance. As technology developed, tracking and sensing systems were used to locate the target and determine the aircraft attitude necessary to aim the weapon so as to account for outside forces acting on the ordnance, e.g., wind, aircraft speed, etc. Such a system typically displays a "crosshair" indicative of actual aircraft attitude and a geometric shape indicative of the required aircraft attitude to provide a high probability of striking the target with the weapon. The pilot is required to maneuver the aircraft so as to place the cross-hair in the firing solution defined by the shape prior to firing the weapon. The aiming instructions e.g., cross-hair and geometric shape, are typically displayed on a control panel, a heads-up display, or helmet-mounted display which provides the pilot with visual information relating to the target position, own ship attitude, heading, speed and altitude.

Although such aiming systems improved weapons delivery accuracy, the pilot is still under a significant burden to regulate aircraft heading and pitch attitude. It is well-known that a skilled helicopter pilot can control aircraft attitude within about 1 degree of pitch and yaw. Although this may seem very accurate control, a 1 degree variation in pitch or yaw will have a significant effect on the trajectory of a projectile.

One solution to the above mentioned problem of weapons delivery accuracy is to provide the aircraft weapons systems with articulated mountings, e.g. rocket launchers and gatling guns articulated in azimuth and/or elevation. The fire control solution is then used to control the pointing direction of the weapon mount to improve weapons delivery accuracy and reduce pilot workload. However, when the weapons mount reaches the limits of its travel, i.e., constraint limit, the fire control system is no longer capable of controlling the weapon mount to point the weapon directly at the firing solution.

Additionally, certain sensors used for target tracking and weapons targeting have constraint limits. For example, a nose mounted, forward looking radar may only be able to detect and track targets within a limited area relative to the nose of the aircraft, e.g., plus or minus 130 degrees. If a target is allowed to move outside the field of operation defined by the sensor constraint limits, the sensor will lose track of the target.

DISCLOSURE OF THE INVENTION

Objects of the invention include provision of an improved flight control system for a rotary wing aircraft, which is integrated with an aircraft fire control system for providing aircraft attitude constraint control using weapon, weapon mount or sensor constraint limit information to control the aircraft yaw attitude, pitch attitude and roll attitude to thereby prevent the aircraft from exceeding the weapon or sensor constraint limits.

A further object of the present invention is to provide an integrated fire and flight control system having attitude constraint control which maintains pilot command authority to override the effects of constraint limit control on aircraft yaw attitude, pitch attitude and roll attitude.

According to the present invention, the occurrence of a weapon, weapon mount or sensor reaching a constraint limit induces a fade-in of a constraint limiting axis command signal for a respective attitude axis as the aircraft attitude reference, replacing the flight control system attitude feedback error signal for the respective attitude axis.

In further accord with the present invention, the constraint limiting axis command signals provide the aircraft attitude reference only while the pilot manually depresses and holds an enable switch, and during attitude constraint control, the pilot stick control remains the primary input to the flight control system to thereby provide override capability for pilot commanded maneuvers.

The present invention reduces pilot workload during weapons targeting and target tracking by providing constraint limiting axis command signals as the aircraft attitude reference. The constraint limiting axis command signals provide the necessary attitude reference to control aircraft attitude to prevent weapon or sensor constraint limits from being exceeded. The pilot commanded stick input maintains primary authority, and therefore the pilot is capable of fully exercising the aircraft's inherent agility for evasive maneuvers, to break lock from enemy targeting systems or to engage new threats.

The foregoing and other objects, features and advantages of the present invention will become more apparent in light of the following detailed description of exemplary embodiments thereof, as illustrated in the accompanying drawings.

BEST MODE FOR CARRYING OUT THE INVENTION

The integrated fire and flight control (IFFC) system of the present invention is particularly well suited for aiding a helicopter pilot in the target acquisition phase of the mission, and for improving the overall weapons effectiveness by increasing ordnance delivery accuracy.

To aid a pilot in weapon targeting, weapons may be provided with articulated mountings wherein a fire control system provides azimuth commands and elevation commands to control the pointing direction of the mounting for weapon targeting. In response to the fire control commands, the mounting moves the weapon with respect to the aircraft body to maintain the proper pointing direction of the weapon so that ordinance will impact the target. Weapon mountings may also be made responsive to the pointing direction of the pilot's helmet such that when the pilot moves his head to look at a target, the mounting moves the weapon with respect to the aircraft body to point in the direction that that pilot's head is oriented with respect to a reference position. However, if the articulated mount reaches the limit of its travel, i.e., the weapon reaches its constraint limit, the fire control solution or the pilot's head movement is no longer able to control the mounting for weapon targeting control.

Similarly, the aircraft may be provided with numerous sensors for target surveillance, tracking, weapons targeting, navigation, etc. Depending on the type of sensor and its mounting location on the aircraft body, the sensor may have a limited field of operation with respect to the body of the aircraft. If a target moves outside that field of operation, i.e., the target position exceed the sensor constraint limit, contact with the target will be lost.

Figure 1:
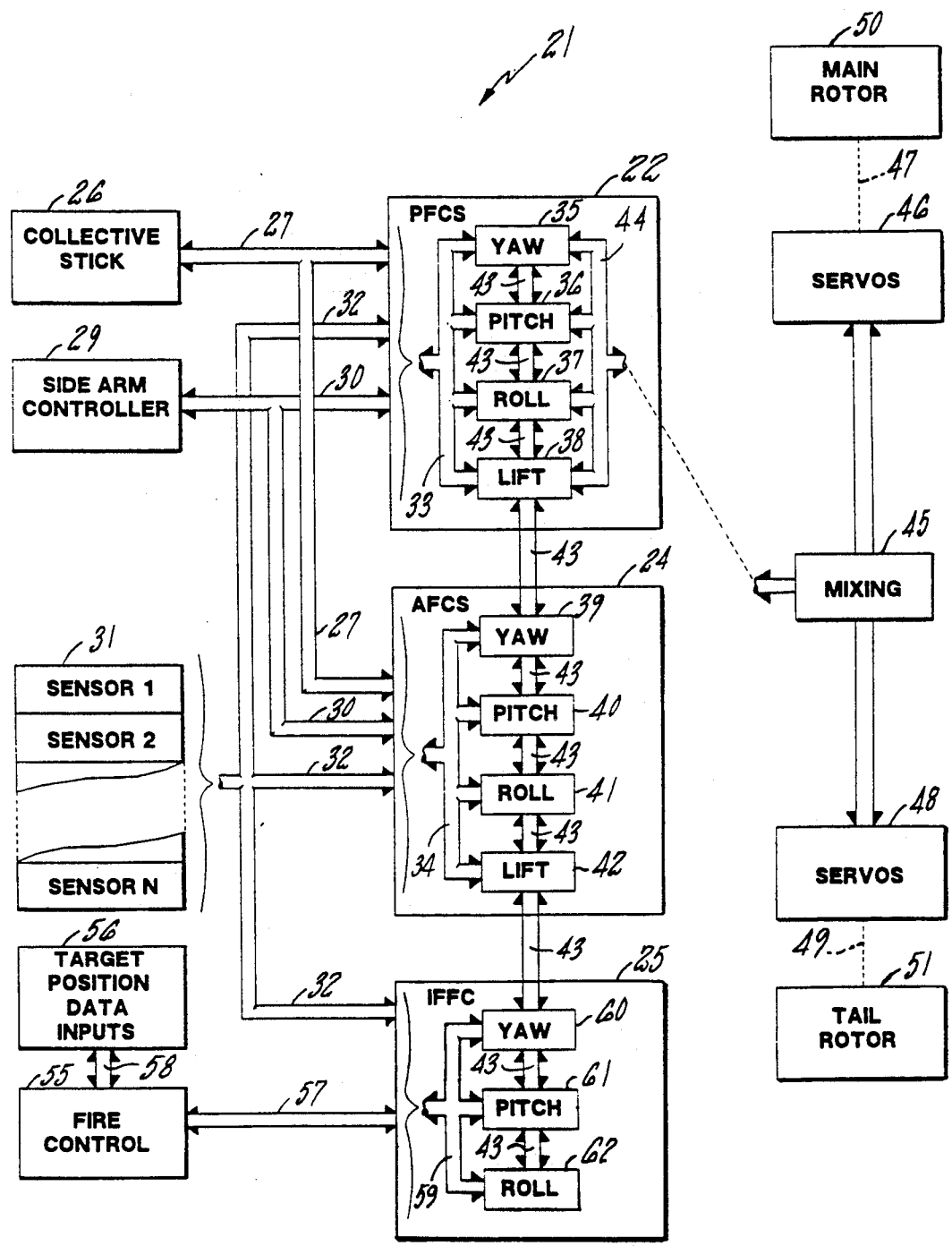
FIG. 1 is a block diagram of the integrated fire and flight control system of the present invention.

The constraint limit control of the present invention provides control of aircraft attitude to prevent weapon or sensor constraint limits from being exceeded. Referring to FIG. 1, the system of the present invention 21 includes a primary flight control system (PFCS) 22, an automatic flight control system (AFCS) 24 and an integrated fire and flight control system (IFFC) 25. The PFCS receives displacement command output signals from a displacement collective stick 26 on lines 27. The AFCS also receives collective stick discrete output signals on the lines 27. The PFCS and AFCS each receive the force output command signals of a four-axis sidearm controller 29 on lines 30. The AFCS and PFCS also receive sensed parameter signals from sensors 31 on lines 32. The pilot command signals on lines 27 and 30 and the sensed parameter signals on lines 32 are shown consolidated within trunk lines 33 and 34 in the PFCS and AFCS, respectively.

The PFCS and AFCS each contain control modules for controlling the yaw, pitch, roll and lift axes of the aircraft. These modules are shown by blocks 35-38 for the PFCS and blocks 39-42 for the AFCS. The PFCS modules provide rotor command signals, and the AFCS modules provide conditioning and/or trimming of the PFCS rotor command signals. The PFCS and AFCS modules are interconnected through bus 43.

The PFCS and AFCS use a model following algorithm in each control axis to provide rotor command signals on output lines 44 to a rotor mixing function 45 which commands displacement of mechanical servos 46 and linkages 47 to control the tip path plane of a main rotor 50. Additionally, the rotor mixing function 45 controls tail rotor servos 48 which control the thrust of a tail rotor 51 through linkages 49. The sensed parameter signals from sensors 31, on lines 32, provide the PFCS and AFCS with the aircraft's angular rate and attitude response to the main rotor and tail rotor command signals. Additionally, the sensors provide information related to velocity, altitude, acceleration, etc., which information may or may not be used by the flight control system.

The IFFC 25 receives fire control data from a fire control system 55 on lines 57. The IFFC also receives sensed parameter signals on lines 32 from sensors 31. Target position data is provided to the fire control 55 from target position/angle data inputs 56 on lines 58. The target position/angle data may be provided from a variety of sources as is well-known in the art, e.g., line of sight angle sensors, map and position data, infrared sensors, laser sensors, radar sensors, etc. The fire control data on lines 57 and sensed parameter signals on lines 32 are shown consolidated within trunk lines 59 in the IFFC.

The IFFC contains control channel modules for providing yaw, pitch and roll control signals to the AFCS. These modules are shown by blocks 60, 61 and 62, respectively. The IFFC modules are interconnected to the PFCS and AFCS modules through the bus 43. Normally, in response to pilot commands, the AFCS provides the desired yaw, pitch and roll attitude reference. The difference between these attitude reference commands and actual aircraft attitude is attitude feedback error signals which the AFCS continuously attempts to reduce to zero. However, during operation in a "constraint limiting mode" when a weapon or sensor selected for constraint limiting exceeds its respective constraint limit for a given attitude axis, the corresponding AFCS yaw, pitch and roll axis attitude feedback error signals are replaced with constraint limiting axis commands for the respective attitude axis. The constraint limiting mode may be enabled by the pilot depressing a switch on the sidearm controller 29, or additional logic (FIG. 6) may be provided for controlling operation of the flight control system in the constraint limiting mode.

Figure 2:
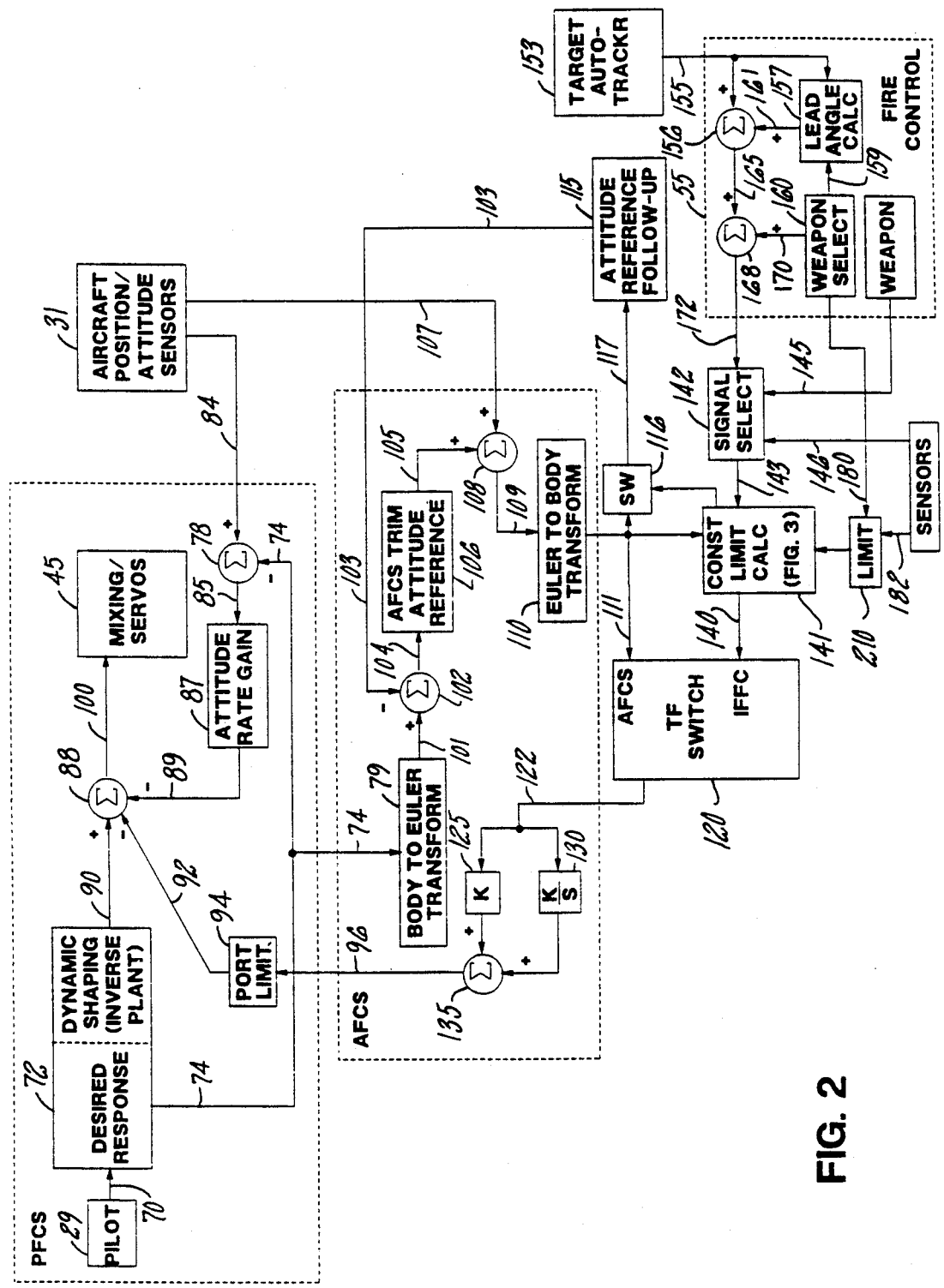
FIG. 2 is a simplified schematic block diagram of the integrated fire and flight control system of FIG. 1.

FIG. 2 illustrates the functional interconnection of the IFFC 25 with the PFCS 22 and the AFCS 24. FIG. 2 will be described with respect to the yaw axis modules 35, 39, 60, e.g., flight control yaw attitude reference and constraint limiting azimuth command signals; however, it will be understood by those skilled in the art that the functional interconnection of FIG. 2 is equally applicable to flight control pitch attitude reference or flight control roll attitude reference and constraint limiting elevation command signals.

The PFCS receives a yaw axis command signal on line 70, provided through trunk lines 33 and lines 30, from the sidearm controller 29 (FIG. 1). In the present embodiment, the sidearm controller is a four-axis force stick in which yaw axis command signals are generated by the pilot's lateral twisting (left or right) of the sidearm controller, pitch axis command signals are generated by the pilot's pushing and pulling (front or back) of the sidearm controller, roll axis command signals are generated by the pilot applying a left or right force to the sidearm controller, and collective commands are generated by the pilot applying an up or down force to the side arm controller. The yaw command signal is presented to the input of signal shaping circuitry 72. The signal shaping circuitry comprises a desired rate response section that provides a commanded yaw rate signal on a line 74 indicative of the desired rate of change of the aircraft attitude about the yaw axis. Additionally, the signal shaping circuitry 72 comprises a dynamic shaping section which is an inverse model of the approximate plant yaw axis response that provides a control command signal on a line 90. The control command signal on the line 90 represents the approximate rotor command necessary to achieve the desired yaw-axis rate of change of the aircraft for each pilot commanded maneuver, and provides the primary control input to the rotor mixing function 45.

The commanded yaw rate signal on line 74 is presented simultaneously to a summing junction 78 in the PFCS, and a Body to Euler Transformation 79 in the AFCS. The summing junction 78 sums the commanded yaw rate signal on line 74 (from the signal shaping circuitry 72) with the aircraft's actual yaw rate, received (from sensors 31, through lines 32 and trunk 33) as a sensed yaw rate signal on line 84. The output of the summing junction 78 is a yaw rate error signal on a line 85. The rate error signal is amplified in a rate gain stage 87 and is provided on a line 89 to one input of a second PFCS summing junction 88. The summing junction 88 also receives the control command signal on line 90 from the signal shaping circuitry 72, and a yaw command modifying signal on a line 92 from a rate and magnitude limiter 94. The limiter 94, which receives a non-limited version of the yaw command modifying signal on a line 96 (through bus 43) from the AFCS, limits the yaw command modifying signal if its magnitude and rate of change limits are exceeded. The output of the summing junction 88 is provided on a line 100, and presented through the PFCS output trunk lines 44 to the mixing function 45.

The magnitude and rate of change of the yaw command modifying signal from the AFCS is a function of the aircraft heading error during normal operations. The yaw command modifying signal provides an aircraft attitude feedback loop around the rotor command signal. The attitude feedback loop is the second of two feedback loops around the rotor command signal; the first being a yaw rate feedback loop provided by the yaw rate error signal on line 89.

The yaw command modifying signal is a calculated value provided by a model following algorithm within the AFCS, based on the actual aircraft response to the rotor command signal. The yaw command modifying signal modifies the rotor command signal to achieve the pilot commanded yaw attitude. A more detailed description of the model following algorithms of the AFCS, and AFCS architecture, is given in commonly owned copending U.S. patent application Ser. No. 07/751,431, entitled "High Speed Turn Coordination For A Rotary Wing Aircraft", the disclosure of which is incorporated herein by reference.

A yaw attitude feedback error signal is normally used to provide the yaw command modifying signal. However, during operation of the IFFC in the constraint limiting mode, a constraint limiting azimuth command is used to provide the yaw command modifying signal. The yaw attitude feedback error signal is developed in the AFCS. The commanded yaw rate signal is provided on the line 74 to the Body to Euler Transformation 79. The Transformation 79 transforms the yaw rate signal, which is in terms of aircraft body axes, to an inertial axes reference on a line 101, which is provided to a summing junction 102. The other input to the summing junction 102 is an attitude reference follow-up error signal on a line 103.

Figure 4:
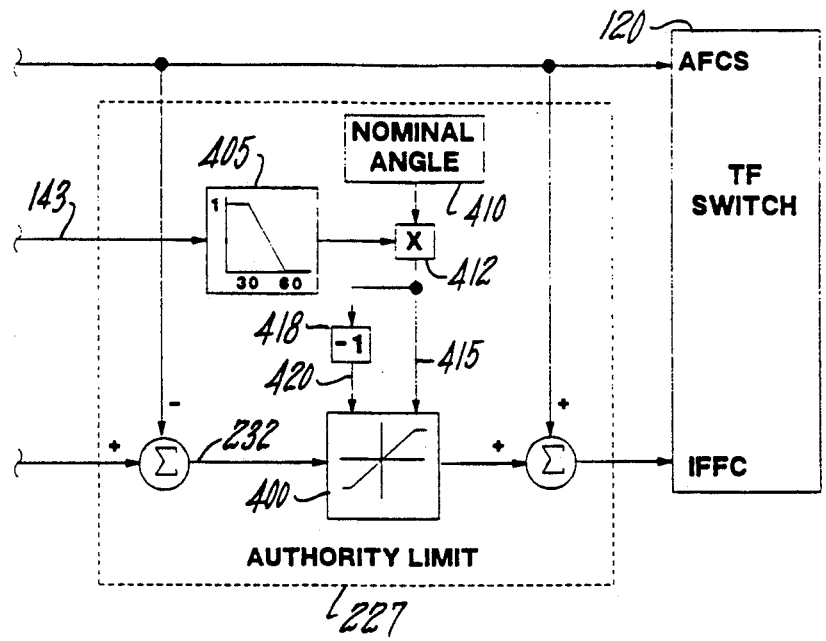
FIG. 4 is a schematic block diagram of a pitch authority limit of the the constraint limit control portion of FIG. 3.

The output of the summing junction 102 is provided on a line 104 to an AFCS trim attitude reference function 106. The reference function 106 is an integral function which converts the commanded yaw rate signal (in terms of inertial axes on the line 101) to a commanded yaw attitude signal on a line 105. The commanded yaw attitude signal is provided to a summing junction 108, the other input of which is a yaw attitude signal on a line 107, provided from sensors 31, through lines 32 and trunk 34 (FIG. 4). The output of the summing junction 108 is the yaw attitude feedback error signal on a line 109 in terms of inertial axes, and is the difference between the commanded yaw attitude on the line 105 and the actual aircraft yaw attitude on the line 107. The yaw attitude feedback error signal is provided to a Euler to Body Transform 110 which transforms the yaw attitude feedback error signal from an inertial axes reference back to an aircraft body axes reference on a line 111. The operation of both Transform functions 79, 110 are described in greater detail in the aforementioned commonly owned copending U.S. patent application Ser. No. 07/751,431, the disclosure of which is incorporated herein by reference.

During operation of the system in the constraint limiting mode, the yaw attitude feedback error signal is replaced by the constraint limiting azimuth command signal. Therefore, there will be a difference between the yaw attitude reference as indicated by the AFCS and the actual aircraft yaw attitude because the yaw attitude feedback error signal was not used to provide the yaw command modifying signal. Therefore, the attitude reference follow-up error signal is provided on the line 103 to the summing junction 102 to modify the rate signal on the line 104. The attitude rate follow-up error signal is provided by an attitude follow-up portion 115 of the IFFC. The attitude follow-up portion receives the attitude feedback error signal on line 111 via a normally open switch 116 and line 117, and converts it to an attitude reference follow-up error signal. The operation of the switch 116 will be described in greater detail hereinafter with respect to FIG. 3.

The yaw attitude feedback error signal on the line 111 is applied to a transient free switch 120. During normal operations, the transient free switch 120 passes the yaw attitude feedback error signal to the line 122, where the yaw attitude feedback error signal is applied via a proportional path containing a gain function 125 and an integral path containing an integral function 130 to a summing junction 135. The output of the summing junction 135 is the yaw command modifying signal on the line 96.

During operation of the system in the constraint limiting mode, the transient free switch 120 replaces the yaw attitude feedback error signal provided on the line 122 from the line 111 with a constraint limiting azimuth command signal on a line 140.

Figure 3:
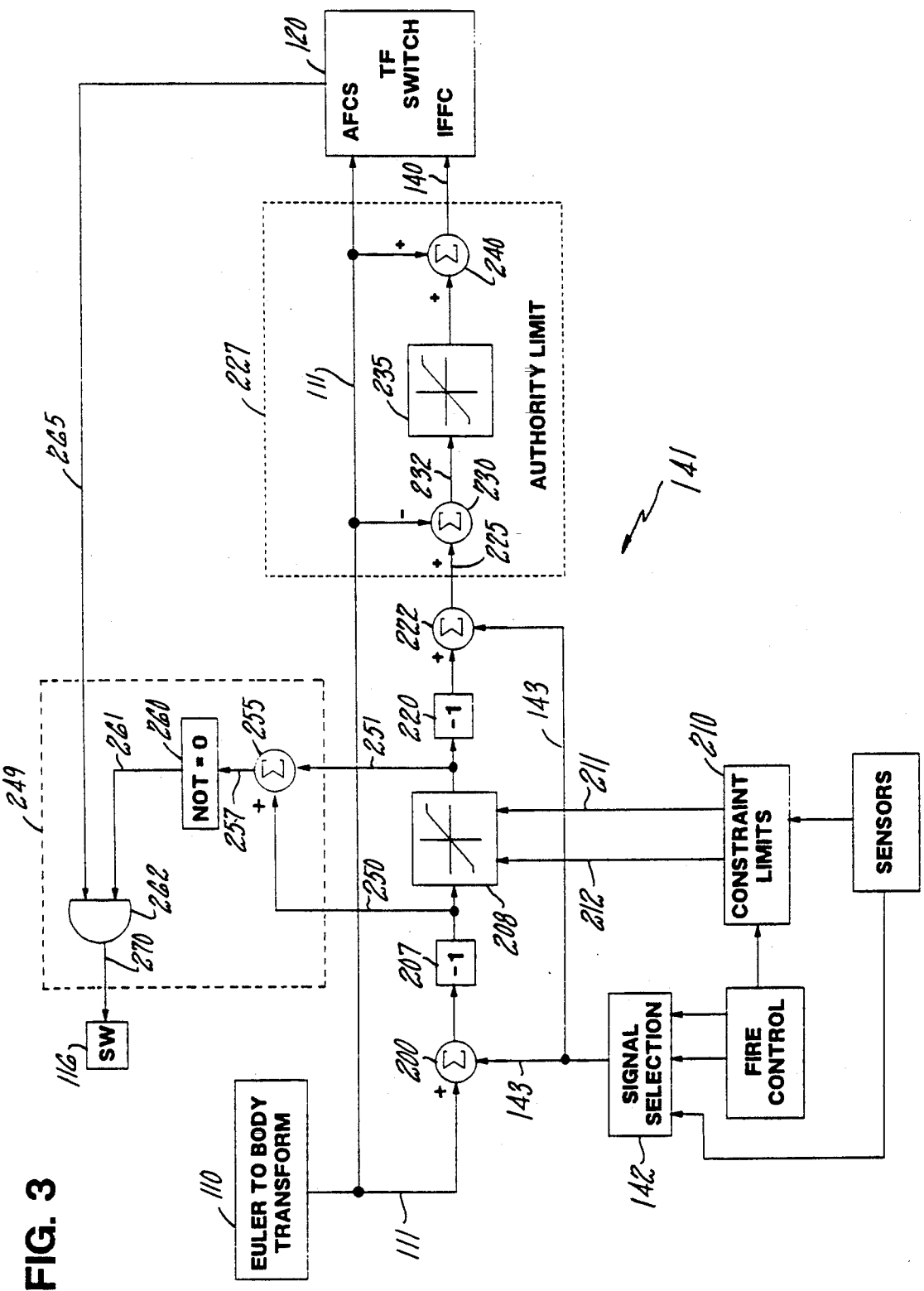
FIG. 3 is a schematic block diagram of a constraint limit control portion of the integrated fire and flight control system of FIG. 2.

The constraint limiting azimuth command signal is provided by a constraint limiting command signal calculation function 141 which is described in greater detail with respect to FIG. 3. The calculation function 141 is responsive to a signal for constraint limiting provided by a signal selection function 142 on a line 143. The signal selection function 142 provides the calculation function 141 with one of three input signals: a fire control azimuth command signal on a line 172 indicative of an azimuth angle, relative to the aircraft body, that the fire control is commanding a selected weapon to aim; a weapon mount azimuth signal on a line 145 indicative of the actual mechanical position of an articulated mount carrying a selected weapon; or a target azimuth position on a line 146 indicative of the target azimuth as determined by a sensor selected for constraint limiting.

The azimuth command signal is provided by a fire control system 55. Target azimuth and elevation information is provided on a line 155 by a target autotracker 153, e.g., an electro-optical tracking device or a radar. The azimuth and elevation information provided by the autotracker 153 is a line of sight vector between the target and an arbitrary point on the aircraft body used for line of sight calculations, e.g., an aircraft reference axis. The line of sight vector is resolved into an elevation component and an azimuth component. The output of the autotracker function 153 is provided on the line 155 to a summing junction 156 and to a lead angle calculation function 157. The other input to the lead angle calculation function 157 is a weapons type signal on a line 159 from a weapons selection function 160. The lead angle calculation function uses the weapons type information and the autotracker information to calculate the amount of weapons offset, i.e., lead angle, based on the type of weapons selected, to impact a target having a track and velocity corresponding to the target track and position information provided from the autotracker function. The lead angle is provided on a line 161 to the summing junction 156 where it is added to the target line of sight vectors to provide a corrected azimuth command on a line 165.

The corrected azimuth command on the line 165 is applied to a summing junction 168. The other input to the summing junction 168 is a bore sight correction signal on a line 170 from the weapons selection function 160. The bore sight correction signal is indicative of the offset between the selected weapon and the aircraft reference axis. The output of the summing junction 168 is the azimuth command signal on the line 172, which is the azimuth component of the aiming line of sight. The aiming line of sight is indicative of the weapon trajectory determined by the fire control for the weapon to successfully impact the target.

Weapons and sensor constraint limits are provided to the constraint limit command signal calculation function 141 by a constraint limit function 210. The limit function 210 is responsive to a signal on a line 180 from the fire control weapons select function 160 indicative of a particular weapon and its associated mount being selected for constraint limiting. The limit function 210 is also responsive to a signal on a line 182 indicative of a particular sensor being selected for constraint limiting. When a weapon or sensor is selected for constraint limiting, the limit function 210 provides the corresponding constraint limits to the calculation function 141. Similarly, the signal selection function selects the appropriate signal for constraint limiting to provide to the calculation function 141. The limit function may be a look-up table or other suitable memory device for storing information indicative of the constraint limits for various weapons, weapons mounts and sensors capable of operation in the constraint limiting mode.

During operation in the constraint limiting mode for a selected weapon, if the signal for constraint limiting exceeds the selected weapon's azimuth constraint limits, then the calculation function provides a constraint limiting azimuth command to replace the yaw attitude feedback error signal. The constraint limits for a particular weapon are not selected at the mechanical limits of the mount, but rather are within the mechanical limits, e.g., 80% to 90% of the mechanical limit. Similarly, the constraint limits for sensors are selected within the sensor's field of operation.

Depending on the particular weapon or sensor designated for constraint limiting, the constraint limit calculation function receives a signal for constraint limiting from the signal selection function and the associated constraint limit from the limit function. The output of the calculation function is the normal attitude feedback error signal when the constraint limits are not exceeded. However, if the signal selected for constraint limiting exceeds the constraint limits, the portion of the signal which exceeds the limit modifies the attitude feedback error signal to provided the constraint limiting axis command signal.

It will therefore be understood by those skilled in the art that the IFFC constraint limiting function uses the AFCS attitude hold signal path, which is normally provided with an attitude feedback error signal. The normal attitude hold function is engaged prior to initiation of IFFC constraint limiting. After initiation of IFFC constraint limiting, the normal attitude feedback path for the respective axis is modified by replacing the attitude feedback error signal with the constraint limiting axis command signal for the respective axis.

The constraint limit command signal calculation function 141 for the yaw axis is shown in greater detail in FIG. 3. Referring to FIG. 3, the yaw attitude feedback error signal is provided on the line 111 to a summing junction 200. The other input to the summing junction 200 is the signal for constraint limiting on line 143 provided by the signal selection function 142. The output of the summing junction 200 is an IFFC yaw attitude error signal which is provided to a gain function 207 having a gain of negative one. The magnitude of the IFFC yaw attitude error signal is indicative of the deflection angle of the selected device with respect to the aircraft yaw axis, e.g., the pointing direction of a weapon mount, the azimuth command provided by the fire control, or the target azimuth as determined by a sensor with respect to the aircraft yaw axis. The gain function 207 changes the sign of the IFFC yaw attitude error signal before it is applied to a limiter 208 so that the constraint limits provided by the constraint limit function 210 are properly phased with respect to the polarity of the IFFC yaw attitude error signal.

The magnitude of the limiter limits is determined by the constraint limit function 210. Depending on the weapon or sensor selected for constraint limiting, the magnitude of the upper and lower limits may be different. The upper limit is provided on a line 211 and the lower limit is provided on a line 212 to the limiter.

The output of the limiter 208 is provided to a gain function 220 also having a gain of negative one. The output of the gain function 220 is provided to a summing junction 222 where it is summed with the signal for constraint limiting on the line 143. The output of the summing junction 222 is the constraint limiting azimuth command (CLAC) signal on a line 225.

The CLAC signal is provided on the line 225 to an authority limit 227. In the authority limit 227, the CLAC signal is applied to a summing junction 230, the other input of which is the yaw attitude feedback error signal on the line 111. The output of the summing junction is a constraint limiting error signal on a line 232 indicative of the change in yaw attitude commanded by the CLAC signal from the pilot's command yaw attitude. The constraint limiting error signal is provided on the line 232 to a limiter 235 which limits the magnitude of the error signal to thereby limit the magnitude of the change in aircraft attitude which can be commanded by the CLAC signal. The magnitude of the limiter 235 limits is typically between 3 to 5 degrees. The output of the limiter 235 is provided to a summing junction 240, the other input of which is the attitude feedback error signal. The output of the summing junction 240 is the CLAC signal on the line 140 to the transient free switch 120.

The operation of the constraint limit function 210 is best understood by example. Suppose a Gatling gun is selected for constraint limiting having mechanical azimuth limits of plus or minus 100 degrees with respect to the nose of the aircraft, e.g., it can only move in a 200 degree arc. The constraint limits for the gatling gun may be set at plus or minus 90 degrees. Therefore, if the magnitude of the signal for constraint limiting on the line 143 is greater than 90 degrees, i.e., the target is greater than 90 degrees relative to the nose of the aircraft, the limiter limits the magnitude of the error signal to 90 degrees. If the aircraft is trimmed in a hover position, the magnitude of the attitude feedback error signal is zero. When the target position is 95 degrees relative to the aircraft, the output of the summing junction 200 is negative 95. The output of the gain function 207, which is provided to the limiter 208, is 95. The limiter limits the magnitude of the output to 90, and the output of the gain function 220 is negative 90, which is applied to summing junction 222. The other input to the summing junction 222 is the signal for constraint limiting on the line 143, and the output of the summing junction, i.e, the CLAC signal, is 5. The CLAC signal is next applied to the authority limit, which limits its magnitude with respect to the attitude feedback error signal as described herein.

As will be understood by those skilled in the art, the CLAC signal will only be different than the attitude feedback error signal if the constraint limits are exceeded. Therefore, attitude reference follow-up is only required during operation in the constraint limiting mode if the constraint limits are exceeded. Attitude follow-up logic 249 controls the operation of the normally open switch 116 to provide attitude reference follow-up if the constraint limits are exceeded. The input and the output of the limiter 208 are provided respectively on lines 250 and 251 to a summing junction 255, the output of which is a difference signal indicative of the difference therebetween on line 257. The difference signal is provided to a function 260 which provides a follow-up enable signal on line 261 when the difference signal is not equal to zero, and the output of which is zero if the difference signal is equal to zero.

The enable signal is provided to an AND gate 262, the other input of which is a signal on line 265 indicative of the transient free switch 120 being activated for constraint limiting. If the transient free switch is activated for constraint limiting and an enable signal is present on the line 261, the AND gate 262 provides a signal on a line 270 to close the switch 116 to activate attitude reference follow-up. If the transient free switch is not activated, or if the output of function 260 is zero, the output of the AND gate 262 is zero and the switch 116 remains open.

Constraint limiting is implemented in the pitch and roll attitude axis with the same control law as shown with respect to the yaw axis in FIGS. 3 and 4, depending on the needs of the particular weapon or device selected for constraint limiting. However, for a weapon or sensor having both an azimuth and elevation degree of freedom, azimuth constraint control is provided by in the yaw axis, and elevation constraint control is provided in both the pitch and roll axis. For small azimuth angles, e.g., less than 30 degrees, the target is in front of the aircraft and elevation constraint limit control is provided by controlling aircraft attitude in the aircraft pitch axis. Similarly, if the target is on the side of the aircraft, e.g., 60 degrees to 120 degrees, elevation constraint limit control is provided by controlling aircraft attitude in the aircraft roll axis. When the target is located in other regions around the aircraft, elevation constraint limit control is provided by a combination of aircraft pitch axis and roll axis control. The elevation constraint control is provided by modifying the authority limit 227 for the pitch axis and the roll axis as shown in FIGS. 4 and 5 respectively.

Referring to FIG. 4, the authority limit for the pitch axis is shown. The constraint limit error signal for the pitch axis is provided on the line 232 to a limiter 400. The upper and lower limits of the limiter 400 are set by the product of a gain function 405 and a nominal angle for signal limiting 410. The magnitude of the gain function is determined by the magnitude of the azimuth signal for constraint limiting on the line 143. When the magnitude of the azimuth signal for constraint limiting is less than 30 degrees, the gain function has a value of one, e.g., 100%, and as the the magnitude of the azimuth signal for constraint limiting increases above 30 degrees, the magnitude of the gain rapidly falls off, until the gain is zero above 60 degrees. The output of the gain function is provided to a multiplier 412, the other input of which is the nominal angle for signal limiting, which is typically set between 3 to 5 degrees. The output of the multiplier is provided on a line 415 to the limiter 400 to provide the limiter upper limit. The output of the multiplier is also provided on the line 415 to a gain function 418 having a magnitude of negative one. The output of the gain function 418 is the limiter 400 lower limit on a line 420.

It will therefore be understood that if the magnitude of the azimuth signal for constraint limiting is less than 30 degrees, the magnitude of the limiter upper and lower limits will be equal to the nominal angle for signal limiting. The magnitude of the limits decrease to zero as the magnitude of the azimuth signal for constraint limiting increase to 60 degrees, and above 60, the output of the limiter is zero. Therefore, if the magnitude of the azimuth signal for constraint limiting is greater than sixty degrees, the constraint limiting pitch command signal will be equal to the pitch attitude feedback error signal.

Figure 5:
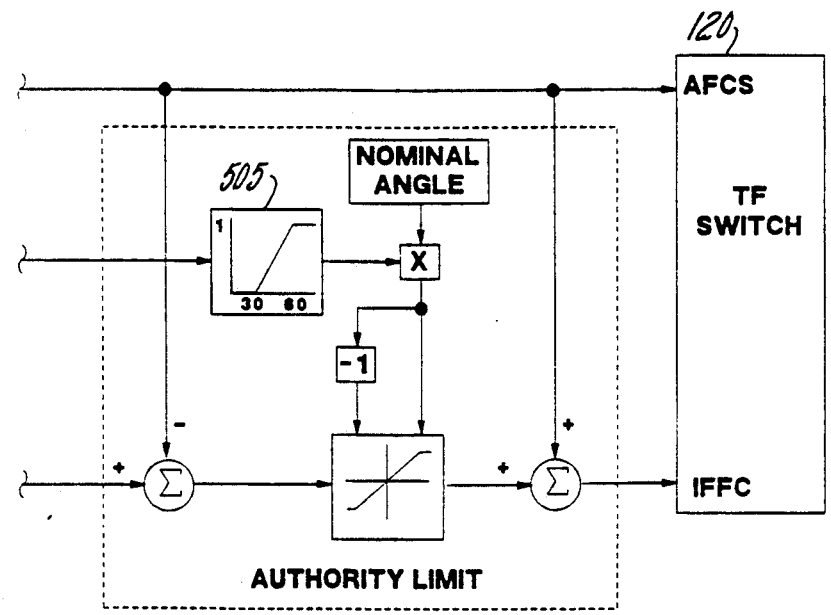
FIG. 5 is a schematic block diagram of a roll authority limit of the the constraint limit control portion of FIG. 3.

Referring now to FIG. 5, the roll axis control is identical to the pitch axis control with the exception of the gain characteristic 505. When the magnitude of the azimuth signal for constraint limiting is greater than 60 degrees, the gain function 505 has a value of one, e.g., 100%, and as the the magnitude of the azimuth signal for constraint limiting decreases below 60 degrees, the magnitude of the gain rapidly falls off, until the gain is zero below 30 degrees. Therefore, for small azimuth signals for constraint limiting, elevation constraint limiting is primarily provided by controlling the aircraft pitch attitude axis. As the magnitude of the azimuth signal for constraint increases, roll attitude axis control is used for elevation constraint limiting.

Figure 6:
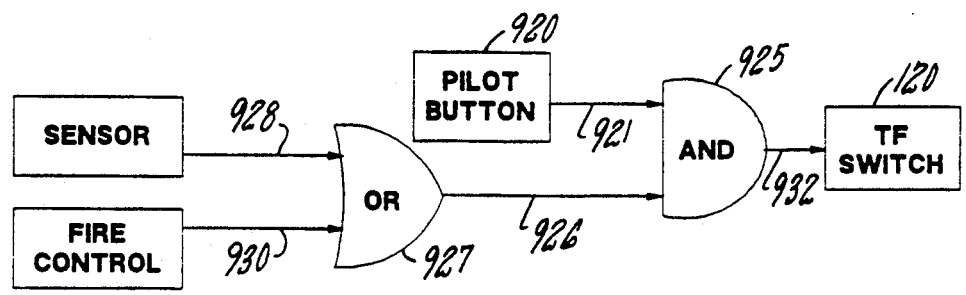
FIG. 6 is a schematic block diagram of control logic for controlling the operation of a transient free switch.

The transient free switch 120 (FIG. 2) is described as being activated in response to the pilot depressing a switch or button on the sidearm controller 29 (FIG. 4). However, it may be desirable to prohibit operation in the constraint limiting mode unless certain other requirements are met. An example of a more complex control for the transient free switch 120 is shown in FIG. 6. When the button 920 on the pilot's sidearm controller is depressed, a signal is provided on a line 921 to AND gate 925. The other input to the AND gate 925 is a constraint limit signal on a line 926 from OR gate 927. OR gate 927 is responsive to a valid sensor signal on a line 928 and a valid fire control signal on a line 930. The valid sensor signal is indicative of a sensor of the type requiring constraint limiting being selected for constraint limiting and functioning properly. Similarly, the valid fire control signal is indicative of the fire control system being activated and a weapon being selected of the type requiring constraint limit control. If both conditions checked by AND gate 925 are met, i.e., the pilot depresses the button 920 and the constraint limit signal is present, then the AND gate 925 provides a signal on a line 932 to activate the transient free switch 120.

The constraint limit control of the present invention may be provided in a situation where more than one constraint limit is in operation at a time. For example, suppose a weapon having a seeker is mounted in an articulated mount. Additionally, the fire control is tracking a target using a sensor having a limited field of operation, and is using fire control azimuth and elevation command signals to control the weapon articulated mount. Three separate constraint limits are active at once: the weapons seeker constraints, the articulated mount constraints, and the sensor constraints. In this case it may be desirable to provide constraint control based on the most limiting constraint for each attitude axis to provide the highest probability of a successful weapons launch. The signal selection function 142 will provide the proper signal for constraint limiting on the line 143, and the limit function 210 must provide the limiter 208 with the constraint limits corresponding to the signal selected for constraint limiting. The selection control may be provided in response to pilot selection, or automatic selection may be provided based on the type of weapon, weapon mount and sensor in use.

The invention is described as controlling yaw, pitch and roll during operation in the constraint limiting mode. However, the invention will work equally as well in an aircraft having rockets articulated in elevation and not in azimuth, or a gun turreted in elevation and not in azimuth. In such a case, elevation constraint limit control is provided as described herein in the pitch and roll axis to prevent the weapon from exceeding its elevation constraint limits. Similarly, if the aircraft is provided with a gun turreted only in azimuth or rockets articulated in azimuth and not in elevation, azimuth constraint limit control is provided in the yaw axis to prevent the weapon from exceed its azimuth constraint limits. In either case, the principles of the present invention can be used to control aircraft yaw attitude, pitch attitude and roll attitude as required for targeting.

For certain weapons, e.g., rockets, the aircraft attitude must be within a specific attitude envelope prior to weapons launch. In this case, the signal for constraint limiting is the aircraft attitude, and the constraint limits are defined by the specific attitude envelope required for firing. Constraint limiting may be made applicable to any aircraft function the performance of which is dependant upon, or is affected by, changes in aircraft attitude. All that is required is a signal indicative of the relationship between the function and aircraft attitude which may be used as the signal for constraint limiting, and the corresponding constraint limits applicable to the function.

The invention is described as being performed in a flight control system in which calculations are determined digitally, as for example in a digital automatic flight control employing a known microprocessor for performing the algorithmic subroutines of the invention. However, the invention may also be accomplished by dedicated digital hardware or by analog hardware if desired. In such case, it may be implemented in a different fashion from that disclosed herein in accordance with the general equivalence between software as shown herein and dedicated digital hardware and software, all as is well-known to those skilled in the art. Additionally, any cycle times, gains, counts, limits, and the like contained herein may of course be adjusted to suit any implementation and utilization of the invention.

Although the invention has been shown and described with respect to exemplary embodiments thereof, it should be understood by those skilled in the art that the foregoing and other changes, omissions and additions may be made therein and thereto without departing from the spirit and scope of the present invention.

We claim:

1. An aircraft flight control system for providing control surface command signals to the aircraft control surfaces thereby controlling the yaw, pitch, roll and lift attitude axes of the aircraft in flight, comprising:
    means for providing a constraint limit in a given attitude axis with respect to an aircraft reference axis, said constraint limit being indicative of a limit relative to said reference axis for a given aircraft subsystem;
    means for providing a signal for constraint limiting for said given attitude axis, said signal for constraint limiting being indicative of a current operating position of said given aircraft subsystem in said given attitude axis relative to said reference axis;
    means responsive to said signals for constraint limiting and said constraint limit for providing constraint limiting axis command signals indicative of an amount the magnitude of said signal for constraint limiting exceeds said constraint limit for said given attitude axis;
    constraint limiting mode indicating means for providing a constraint limiting signal in response to activation of a flight control system constraint limiting mode; and
    signal processing means responsive to the presence of said constraint limiting signal for providing control surface command signal for driving the magnitude of said constraint limiting axis command signals to zero.

2. An aircraft flight control system according to claim 1 wherein said means for providing a signal for constraint limiting comprises:
    fire control means for providing axis command signals for said given attitude axis indicative of a commanded weapon pointing direction with respect to said aircraft reference axis for the weapon to be pointing at a target aiming line of sight;

weapon position indicating means for providing weapon axis signals for said given attitude axis indicative of the pointing direction of a weapons with respect to said aircraft reference axis;

sensor indicating means for providing axis position signals indicative of a position sensed by a sensor with respect to said aircraft reference axis;

selection means for providing a selection signal indicative of a signal being selected for constraint limiting;

said means for providing a signal for constraint limiting being responsive to said selection signal for providing either said axis command signals, said weapon axis signals or said axis position signals as said signal for constraint limiting for said given attitude axis.

3. An aircraft flight control system according to claim 2 wherein said means for providing a constraint limit is responsive to said selection signal for providing constraint limit signals corresponding to said signal for constraint limiting.

4. An aircraft flight control system according to claim 3 further comprising limiting means for limiting the magnitude of said constraint limiting axis command signals for said given attitude axis.

5. An aircraft flight control system according to claim 4 wherein said signal for constraint limiting comprises an azimuth component and an elevation component, said limiting means roll axis limit being equal to zero when said azimuth component is below a first threshold magnitude, said limiting means pitch axis limit being equal to zero when said azimuth component is above a second threshold magnitude, said limiting means roll axis limit increasing from zero to a nominal value, and said limiting means pitch axis limit decreasing from said nominal value to zero as the magnitude of said azimuth component increases from said first threshold magnitude to said second threshold magnitude.

6. An aircraft flight control system according to claim 5 further comprising switch means operable by a pilot, said constraint limiting mode indicating means being responsive to the continuous activation of said switch means for providing said constraint limiting signal, said constraint limiting mode indicating means being responsive to the deactivation of said switch means for removing said constraint limiting signal.

7. An aircraft flight control system according to claim 6 further comprising:

fire control status indicating means for providing a valid fire control signal indicative of said fire control means operating status being within specifications;

sensor status indicating means for providing a valid sensor signal indicative of a sensor operating status being within specifications;

means responsive to either said valid fire control signal or said valid sensor signal for providing an enable signal; and said constraint limiting mode indicating means being responsive to the presence of said enable signal for providing said constraint limiting signal during continuous activation of said switch means, and responsive to the absence of said enable signal or the deactivation of said switch means for removing said constraint limiting signal.

8. A helicopter integrated fire and flight control system for providing control surface command signals to the helicopter control surfaces thereby controlling the yaw, pitch, roll and lift attitude axes of the helicopter in flight, comprising:

control means operable by a pilot to provide axis command signals for controlling a given attitude axis of the helicopter;

means responsive to said axis command signals for providing a desired attitude signal indicative of a desired helicopter attitude in said given attitude axis;

means for sensing the attitude of the helicopter in said given attitude axis and for providing an actual attitude signal indicative thereof;

means responsive to said desired attitude signal and to said actual attitude signal for providing an attitude feedback error signal as a function of the difference between said desired attitude signal and said actual attitude signal; and attitude feedback means for providing control surface command signals to drive the magnitude of said attitude feedback error signal to zero for said given attitude axis;

characterized by:

means for providing a constraint limit in a given attitude axis with respect to an aircraft reference axis, said constraint limit being indicative of a limit relative to said reference axis for a given aircraft subsystem;

means for providing a signal for constraint limiting for said given attitude axis, said signal for constraint limiting being indicative of a current operating position of said given aircraft subsystem in said given attitude axis relative to said reference axis;

means responsive to said signal for constraint limiting and said constraint limit for providing constraint limiting axis command signals indicative of an amount the magnitude of said signal for constraint limiting exceeds said constraint limit for said given attitude axis;

constraint limiting mode indicating means for providing a constraint limiting signal in response to activation of said flight control system constraint limiting mode; and said attitude feedback means being responsive to the presence of said constraint limiting signal for replacing said attitude feedback error signal with said constraint limiting axis command signals for said given attitude axis.

9. A helicopter integrated fire and flight control system according to claim 8 wherein said means for providing a signal for constraint limiting comprises:

fire control means for providing axis command signals for said given attitude axis indicative of a commanded weapon pointing direction with respect to said aircraft reference axis for the weapon to be pointing at a target aiming line of sight;

weapon position indicating means for providing weapon axis signals for said given attitude axis indicative of the pointing direction of a weapons with respect to said aircraft reference axis;

sensor indicating means for providing axis position signals indicative of a position sensed by a sensor with respect to said aircraft reference axis;

selection means for providing a selection signal indicative of a signal being selected for constraint limiting;

said means for providing a signal for constraint limiting being responsive to said selection signal for providing either said axis command signals, said weapon axis signals or said axis position signals a said signal for constraint limiting for said given attitude axis.

10. A helicopter integrated fire and flight control system according to claim 9 wherein said means for providing a constraint limit is responsive to said selection signal for providing constraint limit signals corresponding to said signal for constraint limiting.

11. A helicopter integrated fire and flight control system according to claim 10 further comprising limiting means for limiting the magnitude of said constraint limiting axis command signals for said given attitude axis.

12. A helicopter integrated fire and flight control system according to claim 11 wherein said signal for constraint limiting comprises an azimuth component and an elevation component, said limiting means roll axis limit being equal to zero when said azimuth component is below a first threshold magnitude, said limiting means pitch axis limit being equal to zero when said azimuth component is above a second threshold magnitude, said limiting means roll axis limit increasing from zero to a nominal value, and said limiting means pitch axis limit decreasing from said nominal value to zero as the magnitude of said azimuth component increases from said first threshold magnitude to said second threshold magnitude.

13. A helicopter integrated fire and flight control system according to claim 8 further comprising switch means operable by a pilot, said constraint limiting mode indicating means being responsive to the continuous activation of said switch means for providing said constraint limiting signal, said constraint limiting mode indicating means being responsive to the deactivation of said switch means for removing said constraint limiting signal.

14. A helicopter integrated fire and flight control system according to claim 13 further comprising:
fire control status indicating means for providing a valid fire control signal indicative of said fire control means operating status being within specifications;
sensor status indicating means for providing a valid sensor signal indicative of a sensor operating status being within specifications;
means responsive to either said valid fire control signal or said valid sensor signal for providing an enable signal; and
said constraint limiting mode indicating means being responsive to the presence of said enable signal for providing said constraint limiting signal during continuous activation of said switch means, and responsive to the absence of said enable signal or the deactivation of said switch means for removing said constraint limiting signal.

15. A helicopter integrated fire and flight control system according to claim 8 further comprising attitude follow-up means responsive to the presence of said constraint limiting signal and the magnitude of said constraint limiting axis command signal being greater than zero for driving the magnitude of said attitude feedback error signal to zero for said given attitude axis.

* * * * *